H. J. KROMBACH.
CENTERING DEVICE FOR LATHES.
APPLICATION FILED JULY 16, 1913.
1,095,581.
Patented May 5, 1914.
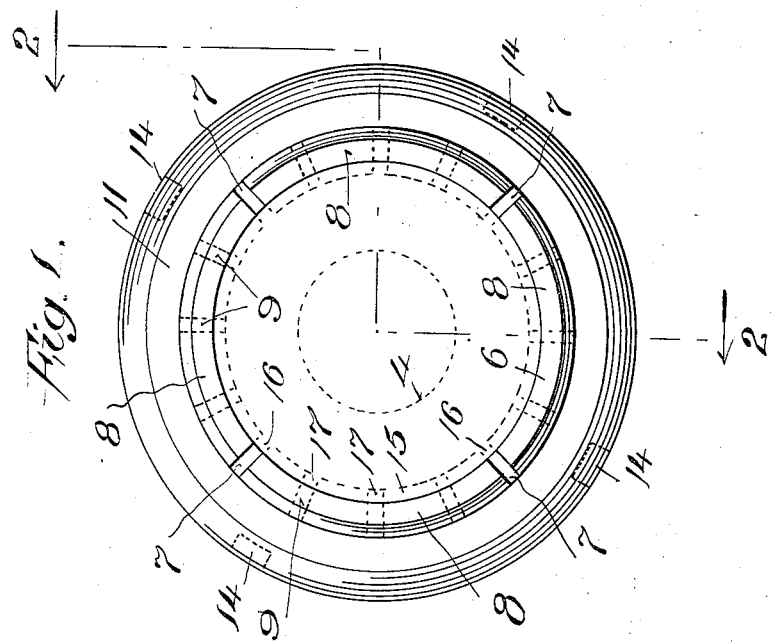
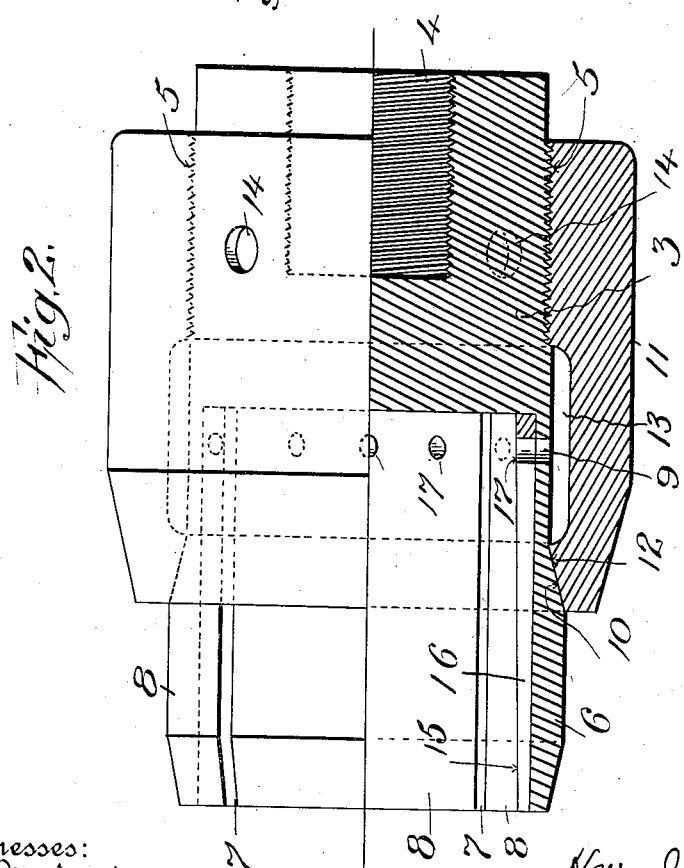
Witnesses:
C. N. Benjamin
Walter A. Darby
Inventor
Harry Julius Krombach
By his Attorney
Samuel E. Darby

UNITED STATES PATENT OFFICE.

HARRY JULIUS KROMBACH, OF NEW YORK, N. Y.

CENTERING DEVICE FOR LATHES.

1,095,581. Specification of Letters Patent. Patented May 5, 1914.

Application filed July 16, 1913. Serial No. 779,230.

*To all whom it may concern:*

Be it known that I, HARRY JULIUS KROMBACH, a citizen of the United States, residing in the city, county, and State of New York, have made a certain new and useful Centering Device for Lathes, of which the following is a specification.

This invention relates to centering devices for lathes and particularly devices of this nature employed for holding armature bearings while being bored.

The object of the invention is to provide a centering device which is simple in construction, of few parts, economical to manufacture, and efficient in operation.

A further object is to provide a centering device which efficiently grips and holds the article to be bored in absolutely true centered position.

A further object is to provide means in a device of the nature referred to for eliminating or removing the cuttings of the boring tool.

A further object is to provide means for accurately centering the articles to be operated on even where such articles vary in size.

Other objects of the invention will appear more fully hereinafter.

The invention consists substantially in the construction, combination, location and relative arrangement of parts, all as will be more fully hereinafter set forth as shown in the accompanying drawing, and finally pointed out in the appended claims.

In the drawing:—Figure 1 is a view in end elevation of a centering device embodying the principles of my invention. Fig. 2 is a view partly in side elevation and partly in longitudinal section on the line 2, 2, Fig. 1, looking in the direction of the arrows.

In the centering device of my invention I employ a metal chuck or head having a solid end portion 3 which is countersunk and threaded in one end thereof, as at 4 for attachment to the revolving spindle of the lathe. The solid portion of the chuck or head is also exteriorly threaded, for a portion of its length, as indicated at 5. Formed integrally with the solid portion of the chuck or head and extending from the opposite end thereof, is a cylindrical shell or tubular portion 6, within which the article to be bored is received. This shell or tubular portion is longitudinally slit through the wall thereof at various suitably spaced points, as indicated at 7, to form the spring clamping jaw portions 8. At the inner end of the shell or tubular portion 6, and adjacent the junction thereof with the solid part 3 of the chuck or head the solid or unslitted portion of the spring clamping jaws 8 are provided with openings 9 through the wall or shell thereof. The exterior surface of the spring clamp jaw portions 8 are beveled, as indicated at 10. Mounted upon the exteriorly threaded portion 5 of the solid part 3 of the chuck or head is an interiorly threaded sleeve 11 which extends in encompassing relation over the shell or tubular portion 6 the inner wall of the end of said sleeve being beveled to correspond to the bevel 10 of the spring clamp jaws, as indicated at 12. The sleeve 11 is interiorly cored out to form a channel 13 upon the inner surface thereof. The openings 9 open into this channel.

The operation of the device is very simple. The chuck or head is screwed onto the end of the spindle or other part of a lathe and the article to be bored, an armature bearing for instance, is inserted in the shell or tubular portion 6 of the device. The sleeve 11 is then turned in any suitable or convenient manner upon the threaded portion of the chuck or head 3, whereby through the engagement and coöperation of the beveled surfaces 10, 12, the spring clamp jaws are forced into clamping action upon the article contained in the shell or tubular portion and in absolutely uniform true and centered relation. As the boring operation progresses the cuttings from the tool drop through the holes 9 into the recessed channel 13, from which they are removed after the boring operation is completed, and the article removed. The removal of the article is effected by simply backing off the sleeve 11, thereby releasing the clamp action of the spring clamp jaws upon the article permitting the latter to be removed. If desired the sleeve 11 may be provided with sockets, indicated at 14 in the exterior surface thereof to receive a spanner wrench for turning the same.

In order to accommodate different sizes of armature bearings or other articles requiring true and accurate turning in the same centering device I propose to employ a reducing sleeve 15, shown in dotted lines in Fig. 1, which is removably inserted within the bore of the shell or tubular portion 6 when a bearing or other article of small size is to be clamped and centered. This reducing sleeve is provided with longitudinal slits 16 through the wall thereof to correspond with the slits 7 in the tubular portion 6 and for a similar purpose. It is also provided with holes or openings, similar in purpose and arrangement to the holes 9 and arranged to register with said holes 9. This reducing sleeve enables me to clamp and center smaller sizes of armature bearings or other articles than can be efficiently clamped without it, and with the same degree of trueness and accuracy of centering.

Having now set forth the objects and nature of my invention, and a construction embodying the principles thereof, what I claim as new and useful and of my own invention, and desire to secure by Letters Patent is:—

1. A centering device for lathe work, comprising a chuck or head exteriorly threaded and having an integral tubular portion forming an extension of one end thereof, said tubular portion having suitably spaced longitudinal slits through the wall thereof to form spring clamp jaws and also having holes formed through the solid portions of its wall adjacent the junction thereof with the solid portion of the chuck or head, the exterior surface of said tubular portion being beveled or inclined for a portion of its length and a sleeve interiorly threaded to be received on the threaded portion of said chuck or head, and having an interiorly beveled portion fitted to and coöperating with the exterior beveled surface of the clamp jaws, said sleeve having an interior channel encompassing the holes through the walls of said tubular portion and with which said holes communicate.

2. A centering device for lathe work comprising a chuck or head having an integral tubular portion extending from one end thereof, said tubular portion having longitudinal slits through its wall to form spring clamp jaws, and holes through the solid portion of its wall and having an inclined or beveled exterior surface for a portion only of its length, and a sleeve movably mounted upon the chuck or head and having a correspondingly beveled or inclined surface at the end thereof to coöperate with the inclined surface of the tubular portion, said sleeve having an interior annular channel encompassing said holes and a portion of the length of the slits through the wall of the tubular portion.

3. A centering device for lathe work comprising a chuck or head having an integral tubular portion extending from one end thereof, said tubular portion being longitudinally slitted to form spring clamp jaws and having an inclined or beveled exterior surface for a portion of its length and having holes or opening through the solid portions thereof, a sleeve movably mounted on said chuck or head and having an internal beveled or inclined surface to coöperate with the external beveled or inclined surface of the tubular portion, and a slitted reducer sleeve adapted to be removably mounted in the bore of said tubular portion and having coöperating holes or openings through the solid portions thereof, said sleeve having an interior annular channel arranged to encompass said holes or openings.

In testimony whereof I have hereunto set my hand in the presence of the subscribing witnesses, on this 14th day of July A. D., 1913.

HARRY JULIUS KROMBACH.

Witnesses:
G. A. McGRATH,
W. A. DARBY.